United States Patent [19]
Sasaki et al.

[11] Patent Number: 5,446,663
[45] Date of Patent: Aug. 29, 1995

[54] APPARATUS FOR CONTROLLING DAMPING COEFFICIENT FOR VEHICULAR SHOCK ABSORBER

[75] Inventors: Mitsuo Sasaki; Shinobu Kakizaki; Fumiyuki Yamaoka; Toru Takahashi; Makoto Kimura, all of Atsugi, Japan

[73] Assignee: Atsugi Unisia Corporation, Kanagawa, Japan

[21] Appl. No.: 991,629

[22] Filed: Dec. 11, 1992

[30] Foreign Application Priority Data

Dec. 19, 1991 [JP] Japan .................. 3-336761

[51] Int. Cl.⁶ .................................. B60G 17/00
[52] U.S. Cl. .................. 364/424.05; 280/707
[58] Field of Search ............. 364/424.05; 280/707, 280/840

[56] References Cited

U.S. PATENT DOCUMENTS

| | | | |
|---|---|---|---|
| 4,825,370 | 4/1989 | Kurosawa | 364/424.05 |
| 5,062,660 | 11/1991 | Satoh et al. | 364/424.05 |
| 5,071,158 | 12/1991 | Yonekawa et al. | 364/424.05 |
| 5,130,926 | 7/1992 | Watanabe et al. | 364/424.05 |
| 5,173,857 | 12/1992 | Okuyama et al. | 280/707 |

FOREIGN PATENT DOCUMENTS

3928993 1/1991 Germany.
341238 4/1991 Japan.

Primary Examiner—Gary Chin
Attorney, Agent, or Firm—Ronald P. Kananen

[57] ABSTRACT

An apparatus for controlling damping coefficients for respective vehicular shock absorbers is disclosed in which a plurality of shock absorbers are interposed between predetermined parts of a vehicle body and tire wheel and are provided with damping coefficient changing members, each changing member varying the coefficients of the damping shock absorbers at multiple stages by changing position of an associated actuator, the actuator receiving a signal to change the position of the damping coefficient changing member on the basis of an input signal derived from a sprung mass vertical G sensor. Particularly, a correction portion is provided in a control unit which varies a position change rate of the damping coefficient changing member according to a value of the input signal derived from an input signal sensor, e.g., the sprung mass vertical G sensor.

13 Claims, 9 Drawing Sheets

APPARATUS FOR CONTROLLING DAMPING COEFFICIENT FOR VEHICULAR SHOCK ABSORBER

BACKGROUND OF THE INVENTION

1. Field of The Invention

The present invention relates generally to an apparatus for controlling a damping coefficient of a shock absorber (also called a damper, but hereinafter referred to as the shock absorber) interposed between an unsprung mass and sprung mass of the vehicle so as to provide an optimum damping force therefrom. The shock absorber is provided with changing means for changing the damping coefficient thereof at multiple stages in response to a control signal.

2. Description of The Background Art

A Japanese Utility Model Registration Application First Publication No. Heisei 3-41238 published on Apr. 19, 1991 exemplifies a previously proposed apparatus for controlling a damping coefficient of the shock absorber which is provided with a variable damping coefficient.

Damping coefficient changing means of each shock absorber recited in the above-identified Japanese Utility Model Registration First Publication includes: a) a fixed orifice having a progressively incremental slit profile; and b) a variable orifice whose position can be electrically or mechanically varied, both fixed and variable orifices being arranged such as to be overlapped on two sheets of discs so that an effective orifice area is continuously varied in response to a rotation of the variable orifice.

Figure 14:
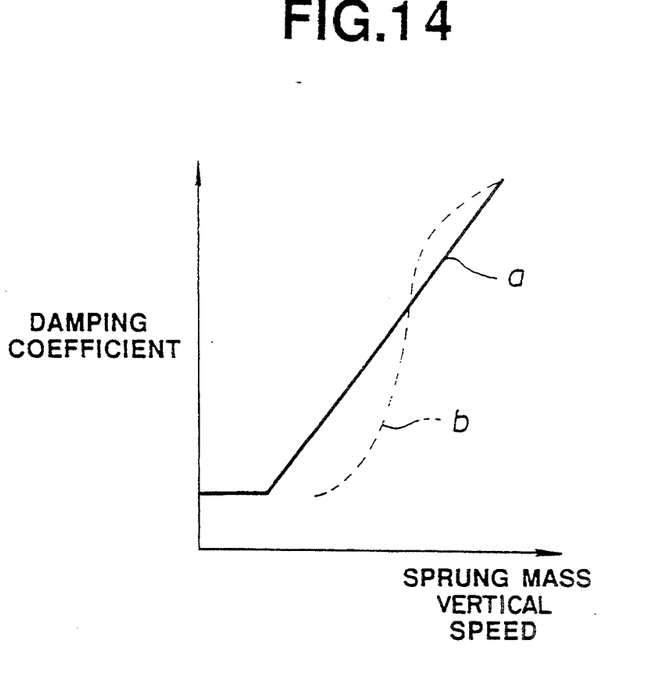
FIG. 14 is a characteristic graph of a damping coefficient varying characteristic with respect to the sprung mass vertical speed in a case of a previously proposed damping coefficient controlling apparatus described in the BACKGROUND OF THE INVENTION.

If the damping coefficient of the shock absorber in the previously proposed controlling apparatus is in proportional control on the basis of input of sprung mass vertical speed, a target damping coefficient varying characteristic a with respect to the sprung mass vertical speed is previously set as shown in FIG. 14 and the effective orifice area is set so as to give the target damping coefficient varying characteristic a.

Figure 15:
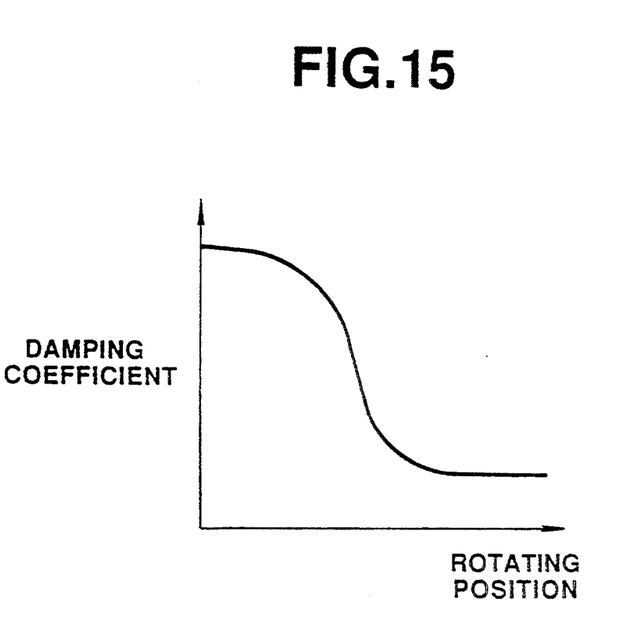
FIG. 15 is a characteristic graph representing a damping coefficient varying characteristic with respect to a rotation position of a variable orifice in the previously proposed damping coefficient controlling apparatus described in the BACKGROUND OF THE INVENTION.

As shown in FIG. 15, an actual damping coefficient varying characteristic b according to a rotation position of the variable orifice described above indicates a non-linear characteristic due to complex relationships from other elements such as damping valve characteristic or constant orifice characteristic.

Therefore, a large deviation occurs between the target damping coefficient varying characteristic a denoted by a solid line of FIG. 14 and actual damping coefficient varying characteristic b denoted by a dot line of FIG. 14.

SUMMARY OF THE INVENTION

It is, therefore, a principal object of the present invention to provide an improved apparatus for controlling a damping coefficient of each or a shock absorber which can achieve a correction of deviation between a target damping coefficient varying characteristic and actual damping coefficient varying characteristic.

The above-described object can be achieved by providing an apparatus for controlling a damping coefficient for a vehicular shock absorber, the shock absorber being interposed between a vehicle body and a tire wheel, comprising: a) an actuator; b) damping coefficient changing means for operatively changing its position so as to provide the damping coefficient for the shock absorber in response to a drive signal derived from the actuator; c) input signal generating means for generating an input signal related to a vehicular behavior; d) damping coefficient controlling means for generating and outputting a control signal to the actuator so as to provide an optimum damping coefficient for the shock absorber on the basis of the input signal from the input signal generating means; and e) correction means for operatively varying a change rate of the position of the damping coefficient changing means of the shock absorber in accordance with a value of the input signal of the input signal generating means.

The above-described object can also be achieved by providing an apparatus for controlling damping coefficients for vehicular shock absorbers, the shock absorbers being interposed between predetermined parts of a vehicle body and corresponding tire wheels, respectively, the apparatus comprising: a) actuators; b) damping coefficient changing means for operatively changing its position so as to provide the damping coefficient for each shock absorber in response to drive signals derived from the actuators; c) input signal generating means for generating input signals related to a vehicular behavior; d) damping coefficient controlling means for generating and outputting control signals to the actuators so as to provide optimum damping coefficients for the respective shock absorbers on the basis of the input signals from the input signal generating means; and e) correction means for operatively varying a change rate of the position of the damping coefficient changing means of each shock absorber in accordance with values of the input signals of the input signal generating means.

DESCRIPTION OF THE PREFERRED EMBODIMENTS

Reference will, hereinafter, be made to the drawings in order to facilitate a better understanding of the present invention.

Figure 1:
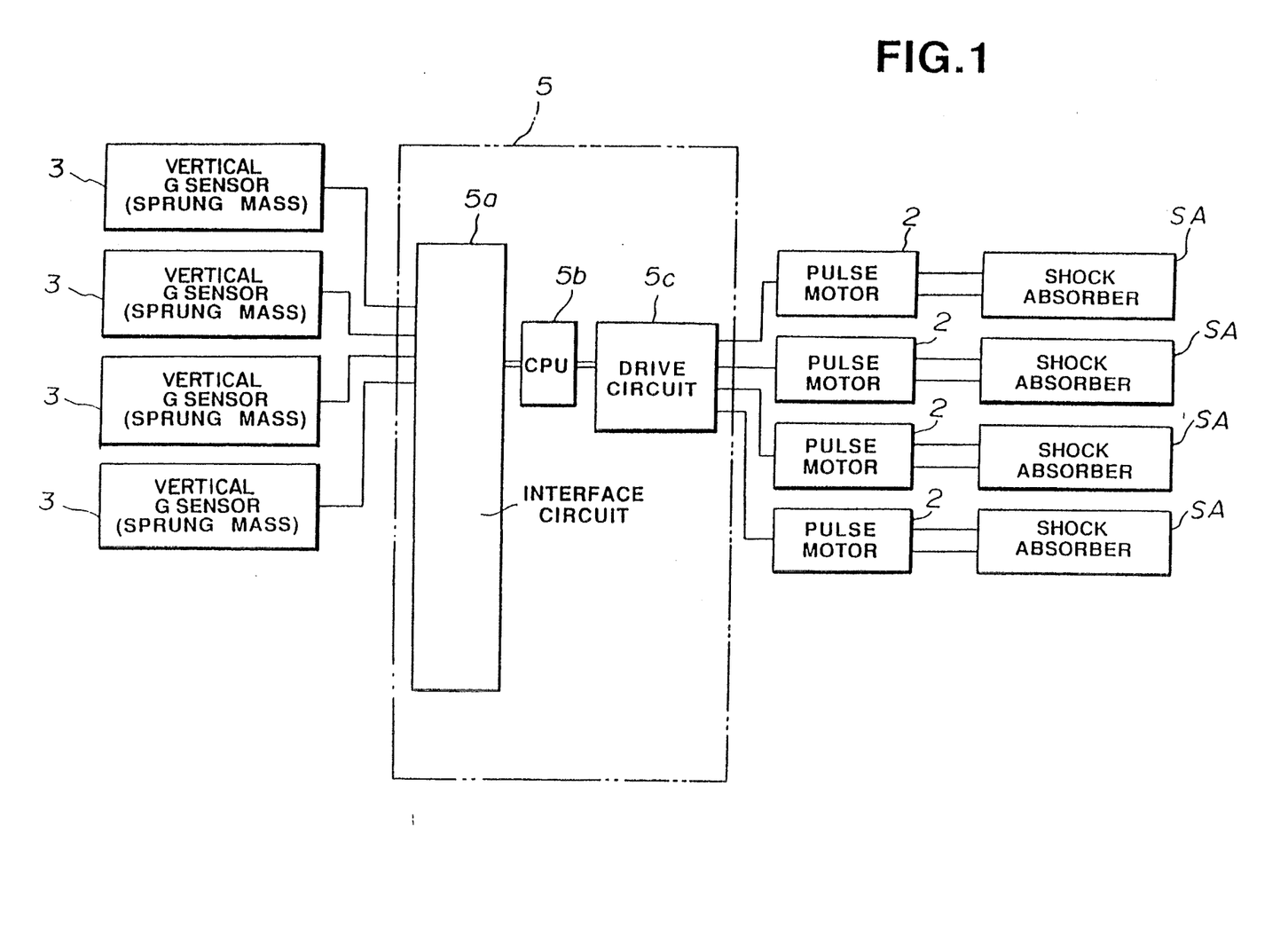
FIG. 1 is a circuit block diagram of shock absorber damping coefficient controlling system in a preferred embodiment according to the present invention.

FIG. 1 shows a whole circuit block diagram of a damping coefficient controlling apparatus in a preferred embodiment according to the present invention.

In FIG. 1, each shock absorber SA of a damping force variable type is disposed between a sprung mass (vehicle body) and an unsprung mass (tire wheel).

Vertical G (acceleration) sensors 3 used to detect vertical accelerations are mounted on parts of the vehicle body placed adjacent mounting positions of the respective shock absorbers SA onto the vehicle body.

A pulse motor 2 is interposed between a control unit 4, i.e., a drive circuit 5c and corresponding shock absorber SA.

A CPU (Central Processing Unit, or alternatively microprocessor) 5b is connected between an interface circuit 5a and drive circuit 5c.

The four vertical G sensors 3 are connected to the interface circuit 5a of the control unit 5.

It is noted that the vertical G (accelerations) are detected such that upward acceleration values are indicated by plus (+) and downward acceleration values are indicated by minus (−).

Each pulse motor 2 serves to change stepwise a damping coefficient position of the shock absorber at the multiple stages.

Figure 2:
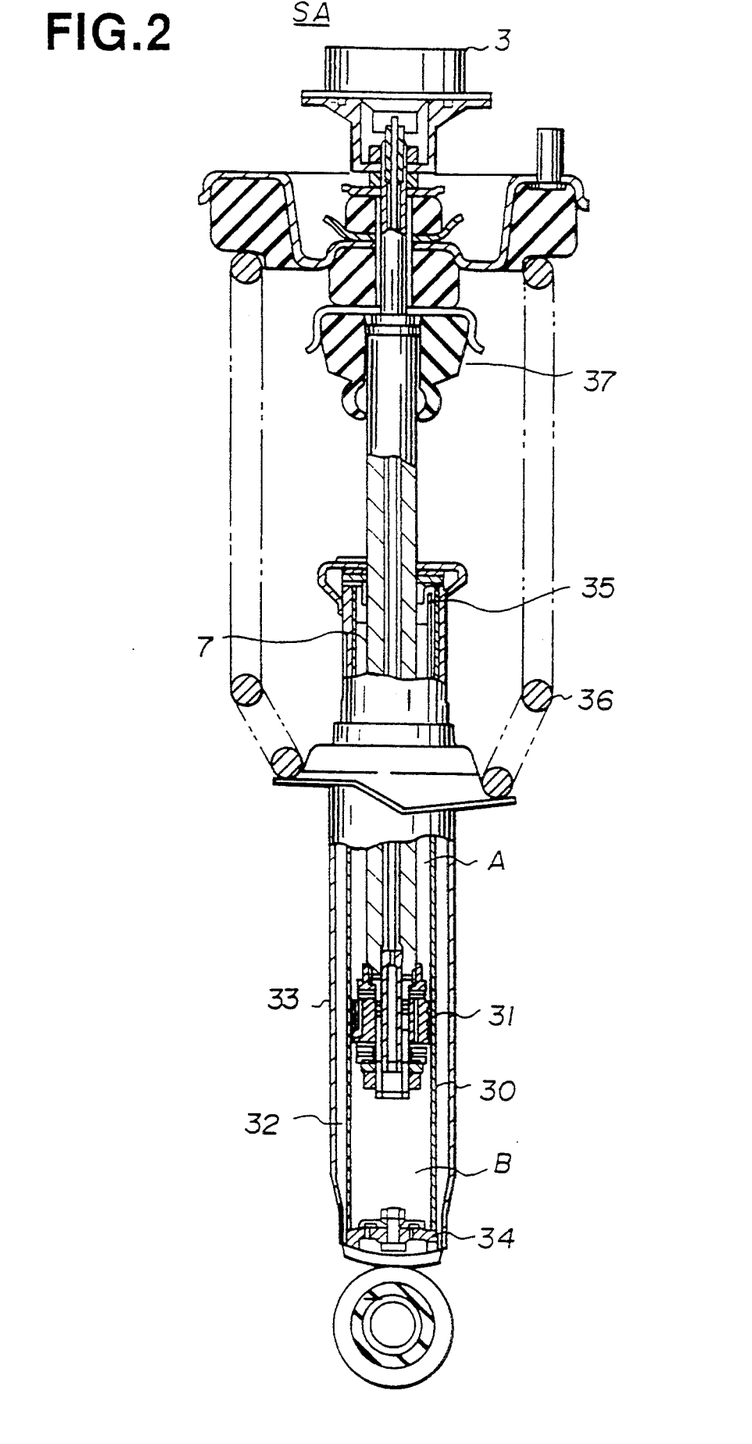
FIG. 2 is a cross sectional view of a shock absorber used in the preferred embodiment shown in FIG. 1.

Next, FIG. 2 shows a cross-sectional view of each shock absorber. SA.

Each shock absorber SA, as shown in FIG. 2, includes: a cylinder 30, a piston 31 disposed in the cylinder 30 so as define the cylinder 30 into an upper chamber A and lower chamber B, an outer envelope 33 to form a reservoir C on an outer periphery of the cylinder 30, a base 34 defining the lower chamber B and reservoir C; a guide member 35 slidably guiding the piston rod 7 which is associated with the piston 31; a suspension spring 36 intervened between the outer envelope 33 and vehicle body; and a bumper rubber member (or bushing) 37.

Figure 3:
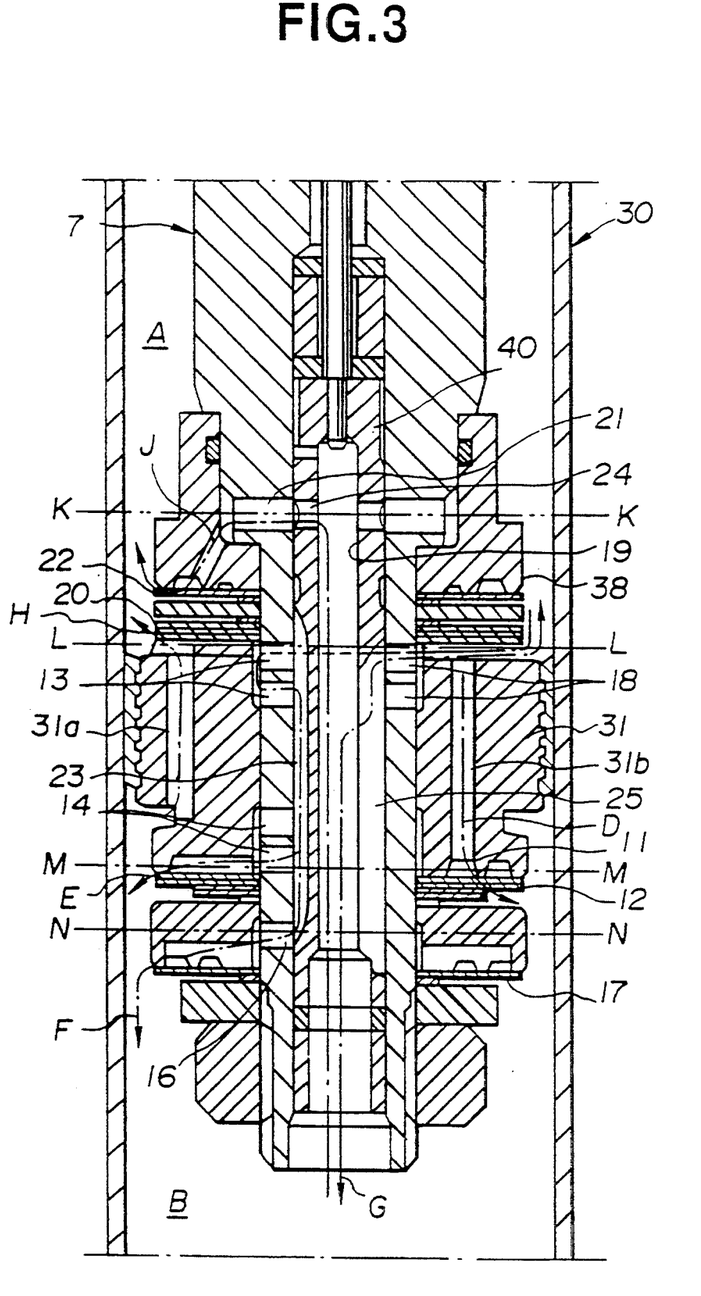
FIG. 3 is an enlarged view of cross-sectional view of a piston member and its surrounding members of the shock absorber used in the preferred embodiment shown in FIGS. 1 and 2.

Next, FIG. 3 shows an enlarged cross sectional view of the piston 31 and its surrounding members.

As shown in FIG. 3, each shock absorber SA has four flow passages through which a working fluid is communicable between the upper chamber A and lower chamber B at the piston's expansion stroke include: 1) an extension (expansion) side first flow passage D from a position of expansion stroke side internal side groove 11, passing through inside and outer peripheral portion of an expansion stroke side damping valve 12, and reaching the lower chamber B; 2) an extension (or expansion) side second flow passage E passing through the second port 13, vertical groove 23, and fourth port 14, from a position of the expansion stroke side outer side groove 15, via an opened valve of the expansion stroke side damping valve 12 to the lower chamber B; 3) an extension (or expansion) stroke side third flow passage F passing through the second port 13, vertical groove 23, and fifth port 16 to the lower chamber B and via the opened extension (expansion) side check valve 17; and 4) a bypass-flow passage G passing through the third port 18, a second lateral hole 25 and hollow portion 19.

In addition, the flow passages of the working fluid within the lower chamber B compressed during the compression stroke which is communicable with the upper chamber A are divided into three flow passages: 1) a compression side first flow passage H from the opened state of the compression side damping valve 20; 2) a compression side second flow passage J from the hollow portion 19, first lateral hole 24, first port 21, and opened valve of the compression stroke side check valve 22 into the upper chamber A; and the bypass flow passage G via the hollow portion 19, second lateral hole 25, and third port 18 and into the upper chamber A.

Furthermore, the adjuster 6 at which the vertical groove 23 and first and second lateral holes 24, 25 are formed is so structured as to enable the damping position of the damping coefficient to be varied at multiple stages between three positions shown in FIGS. 4(A) through 6(C) on the basis of a stepping rotation according to a drive by means of one pulse motor 2.

Figure 4A:
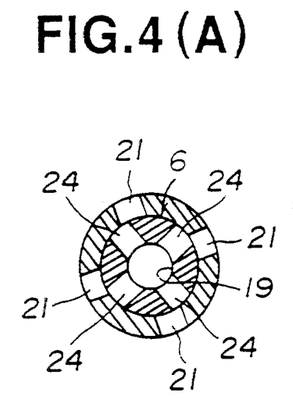
FIGS. 4(A) through 4(C) are cross sectional views cut away along line K—K of FIG. 3, line L—L of FIG. 3, and line N—N of FIG. 3, when the damping position indicates ②.
Figure 4B:
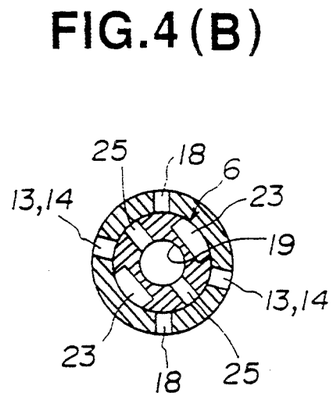
Figure 4C:
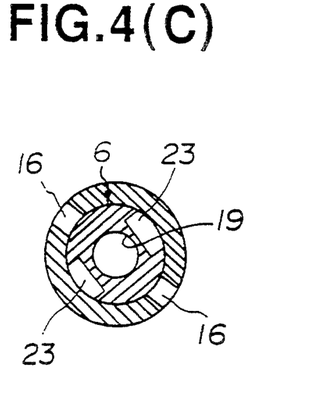

First, at a second position of FIGS. 4(A) through 4(C) (a position of ② in FIG. 7), the communicable passages are expansion stroke side first flow passage D, compression stroke side first flow passage H, and compression stroke side second flow passage J. Consequently, as shown in FIG. 8, the expansion stroke side provides a high damping coefficient ($+X_{max}$ position of FIG. 11) and, on the other hand, the opposite compression stroke side provides a predetermined low damping coefficient ($-X_{soft}$ position).

Figure 5A:
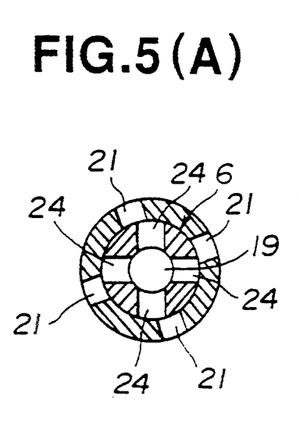
FIGS. 5(A) through 5(C) are cross sectional views cut away along line K—K of FIG. 3, M—M of FIG. 3, and line N—N of FIG. 3, when the damping position indicates ①.
Figure 5B:
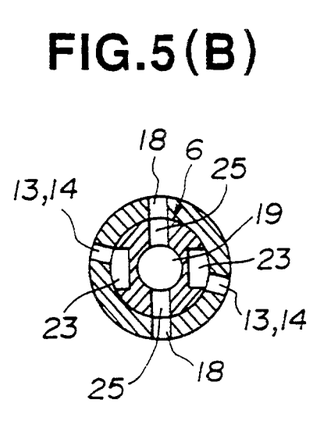
Figure 5C:
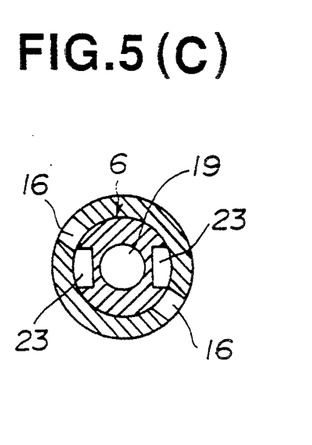

Secondly, at a first position of FIGS. 5(A) through 5(C) (position of ① in FIG. 7), all of four flow passages D, E, F, and G and three flow passages H, J, and G at the compression stroke are communicable.

Figure 9:
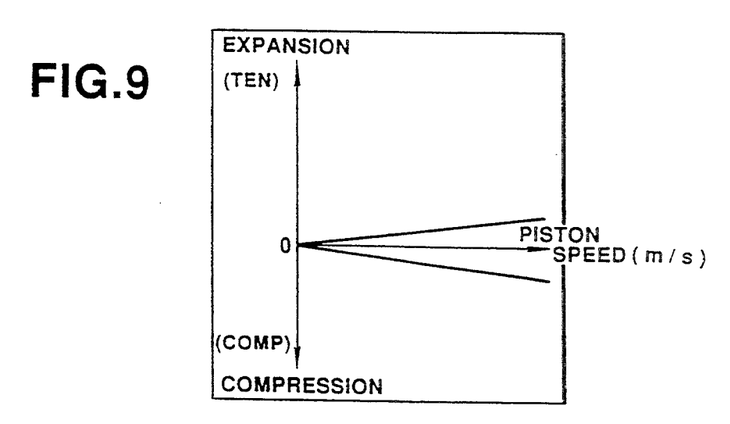
FIG. 9 is a characteristic graph representing damping forces with respect to a piston speed when the shock absorber indicates the first position ①.

Consequently, both expansion and compression stroke side provide the predetermined low damping coefficients ($\pm X_{soft}$ position of FIG. 11), as shown in FIG. 9.

Figure 6A:
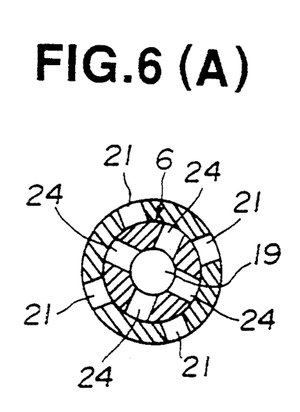
FIGS. 6(A) through 6(C) are cross sectional views cut away along line K—K of FIG. 3, M—M of FIG. 3, and line N—N of FIG. 3 when the damping position indicates ③.
Figure 6B:
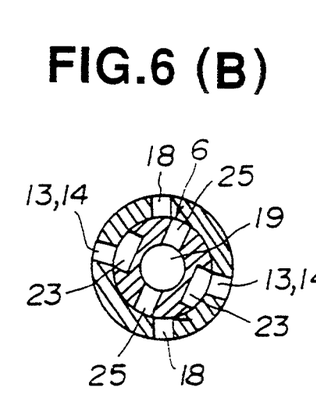
Figure 6C:
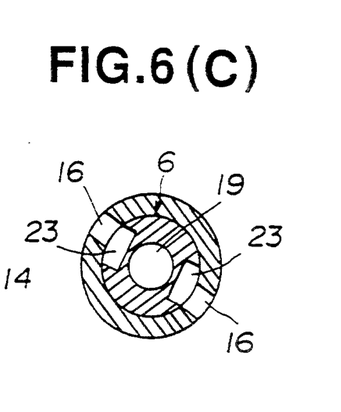

Next, at a third position of FIGS. 6(A) through 6(C) (a position of ③ in FIG. 7), the expansion stroke side first, second, and third flow passages D, E, and F and compression stroke side first flow passage H are communicable.

Figure 10:
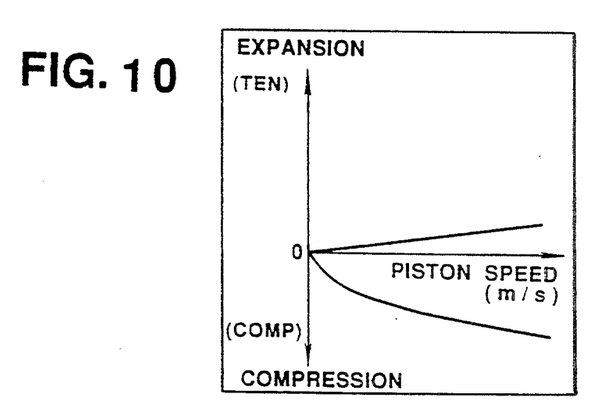
FIG. 10 is a characteristic graph representing a damping force when the shock absorber indicates the third position ③.
Figure 11:
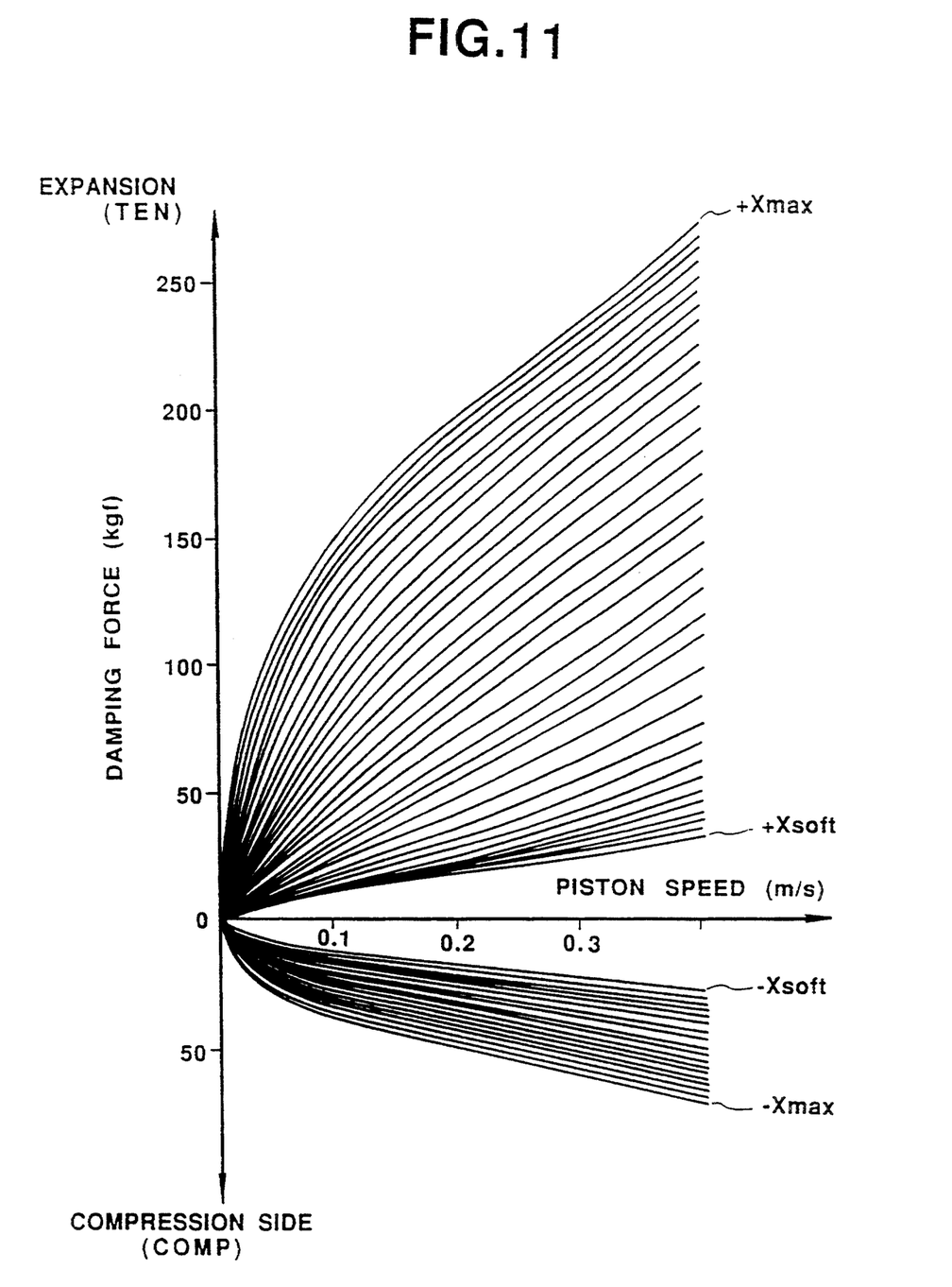
FIG. 11 is a characteristic graph representing a damping force with respect to the piston speed in the preferred embodiment of the damping coefficient controlling apparatus.

Consequently, as shown in FIG. 10, the compression stroke side provides the high damping coefficient ($-X_{max}$ position of FIG. 11) and the opposite expansion stroke side provides the predetermined low damping coefficient ($\pm X_{soft}$ position in FIG. 11).

At the first and third positions, the damping coefficient at either expansion or compression stroke is variable at the multiple stages according to a stepping rotation angle of the adjuster 6. Specifically, the damping coefficient only at the high damping coefficient side is varied in proportion to the stepping rotation angle.

That is to say, the shock absorber SA is so constructed as to vary the damping coefficient at the multiple stages in a range from the low damping coefficient to the high damping coefficient at either or both of the expansion and/or compression stroke side with a characteristic as shown in FIG. 11 on the basis of the stepping rotation angle of the adjuster 6.

Figure 7:
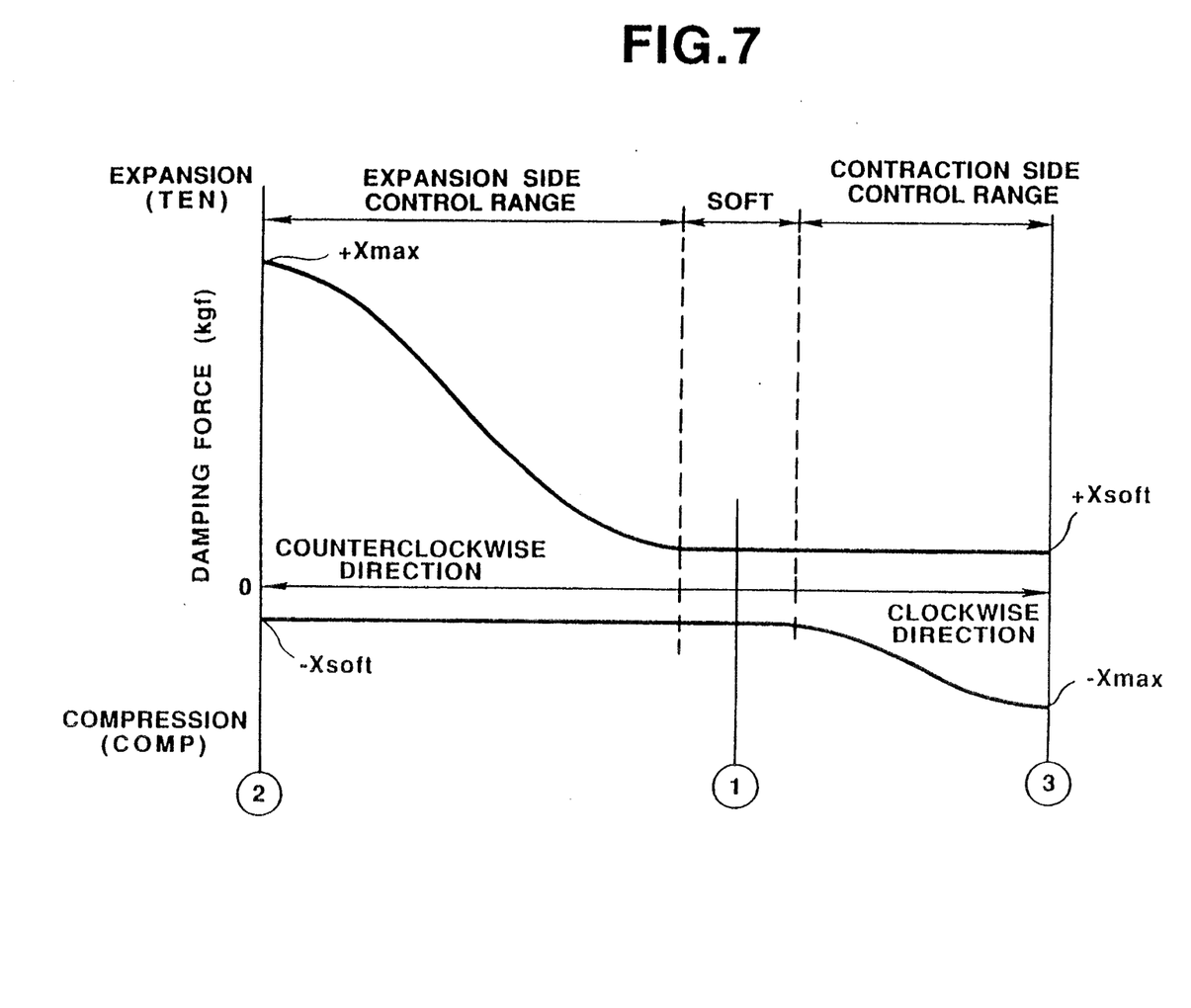
FIG. 7 is a characteristic graph representing variation in the damping coefficient with respect to a stepping angle of an adjuster of the shock absorber used in the preferred embodiment shown in FIGS. 3 through 6 (C).
Figure 8:
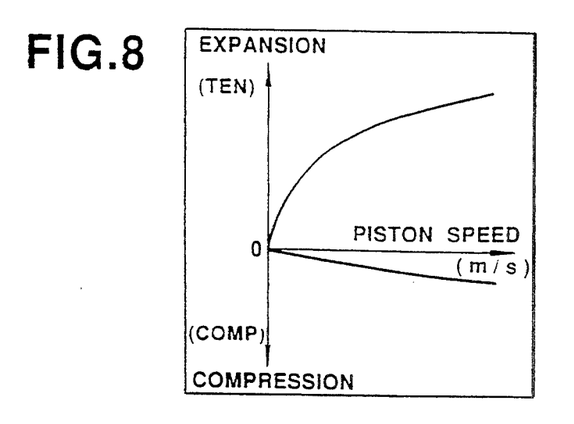
FIG. 8 is a characteristic graph representing a damping force when the shock absorber indicates the second position ②.

In addition, as shown in FIG. 7, when the adjuster 6 is pivoted toward a counterclockwise direction from the position of ① at which both expansion and compression stroke sides provide low damping coefficients, the damping coefficient only at the expansion stroke side is varied toward the higher damping coefficient side. On the other-hand, when the adjuster 6 is pivoted toward a clockwise direction therefrom, the damping coefficient only at the compression stroke side is varied.

Referring back to FIG. 1, since the pulse motor 2 constitutes an actuator to change the damping coefficient for the shock absorber so that a stepping motion thereof causes the adjuster 6 to be pivoted so as to vary the damping coefficient of the shock absorber SA at the multiple stages.

The vertical sensors 3 constitute input means and are so constructed as to detect sprung mass vertical speeds, i.e., detect the sprung mass vertical speeds V of the vehicle body and output electrical signals according to the sprung mass vertical accelerations.

The control unit 5 includes the interface circuit 5a, CPU 5b, drive circuit 5c. The interface circuit 5a receives output signals from the sprung mass vertical G sensors 3.

The control unit 5 constitutes a damping coefficient control means that calculates the sprung mass vertical speeds V on the basis of input signals from the sprung mass vertical G sensors 3, and outputs switching command signals to the respective pulse motors 2 so that the shock absorbers SA provide optimum damping coefficients. On the other hand, the control unit 6 carries out a correction such as to vary a change rate of the stepping rotation angle of the respective adjusters 6 according to values of the sprung mass vertical speeds V in accordance with the stepping rotation angle characteristic of the adjuster 6 with respect to the sprung mass vertical speed V.

It is noted that parameters used for the correction are mapped in a memory circuit of the control unit 5.

Figure 12:
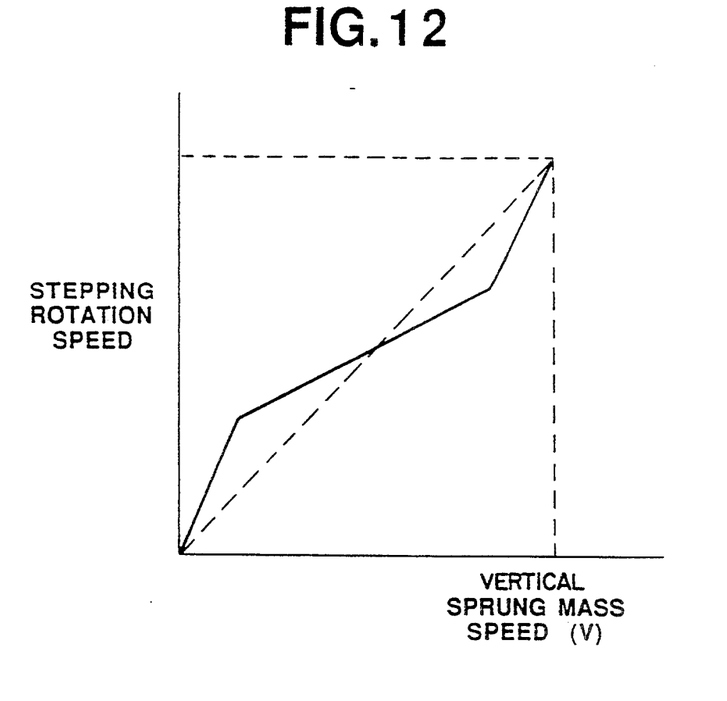
FIG. 12 is a characteristic graph representing a stepping rotation angle of the adjuster with respect to a sprung mass vertical speed in the preferred embodiment of the damping coefficient controlling apparatus.

FIG. 12 shows the stepping rotation angle characteristic of the adjuster 6 with respect to the sprung mass vertical speed V.

As shown by the solid line of FIG. 12, the change rate of the stepping rotation angle is set larger at both low speed and high speed ranges of the sprung mass vertical speed V and set lower at an intermediate speed range thereof.

The change rate of the stepping rotation angle is set non-linearly as denoted by the solid line of FIG. 12 which is substantially symmetrical with respect to the characteristic curve of the actual damping coefficient varying characteristic b with respect to the change in the sprung mass vertical speed shown by the dot line of FIG. 14. That is to say, as denoted by the solid line of FIG. 12, the characteristic provides the non-linearity which is symmetrical to the non-linearity of the damping coefficient varying characteristic with respect to the stepping rotation angle of the adjuster 6.

In this way, when the stepping rotation angle characteristic with respect to the sprung mass vertical speed V is corrected to provide the non-linear characteristic, the non-linearity of the damping coefficient varying characteristic of the adjuster 6 with respect to the stepping rotation angle is canceled so that the damping coefficient varying characteristic can approach to a linear characteristic.

As described above, in the damping coefficient controlling apparatus of the preferred embodiment, the change rate of the stepping rotation angle of the adjuster 6 is varied according to the value of corresponding sprung mass vertical speed V so that the damping coefficient varying characteristic with respect to the sprung mass vertical speed V can be corrected to approach to the linear characteristic. Thus, controllability for the damping coefficients can be improved.

Figure 13:
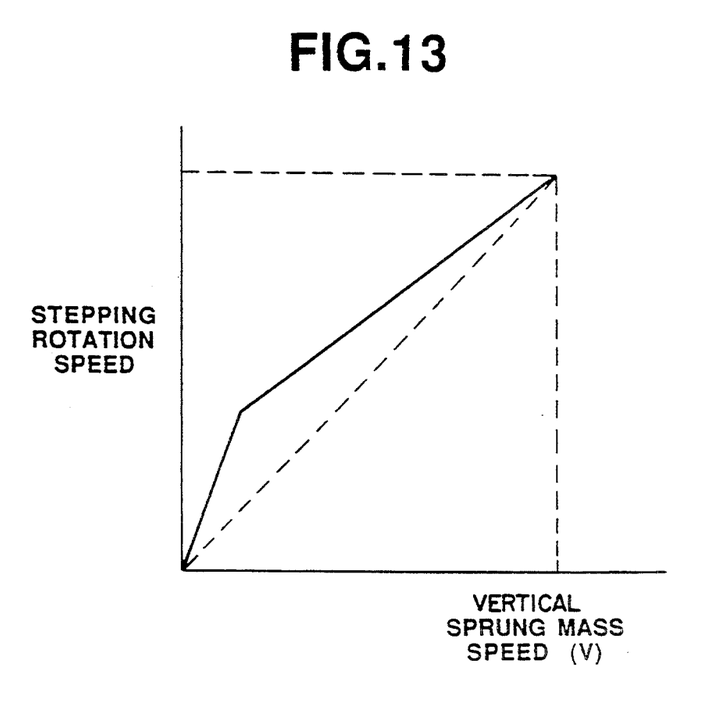
FIG. 13 is a characteristic graph representing a stepping rotation angle of the adjuster with respect to a sprung mass vertical speed in another preferred embodiment of the damping coefficient controlling apparatus.

In the preferred embodiment described above, the change rate of the stepping rotation angle of the adjuster 6 is changed at three stages (as shown in FIG. 7), a change pattern of the change rate can arbitrarily be set. For example, as shown in FIG. 13, the change rate may be set larger only at the low speed range of the sprung mass vertical speed and may be set lower at the remaining intermediate and high speed ranges thereof. Consequently, only insufficient control force at the low speed range of the sprung mass vertical speed can be eliminated.

In addition, although in the preferred embodiment the damping coefficient range at each of the expansion and compression stroke sides is separately controlled from each other and that at the opposite stroke side is controlled to provide the soft damping coefficient, both damping coefficients at the expansion and compression stroke sides may simultaneously be changed.

As described hereinabove, in the damping coefficient controlling apparatus for the shock absorbers according to the present invention, position change rates of the damping coefficient changing means are varied according to the values of input signals of input means. Therefore, the damping coefficient varying characteristic with respect to the input signals is arbitrarily corrected so that the deviation between the target damping coefficient varying characteristic and actual damping coefficient varying characteristic can be corrected.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An apparatus for controlling a damping coefficient for a vehicular shock absorber, the shock absorber being interposed between a vehicle body and a tire wheel, comprising:

a) an actuator;
b) damping coefficient changing means for operatively changing the damping coefficient for the shock absorber in response to movement of said actuator, said damping coefficient changing means having variable rate of change;
c) input signal generating means for generating an input signal related to a vehicular behavior;
d) damping coefficient controlling means for generating and outputting a control signal to said actuator so as to provide an optimum damping coefficient for the shock absorber via said damping coefficient changing means on the basis of the input signal from the input signal generating means; and
e) correction means for operatively correcting the rate of change of said damping force coefficient changing means of the shock absorber corresponding to the variation in the rotated position of said damping coefficient changing means so as to correct a deviation between a target damping coefficient varying characteristic of the shock absorber and an actual damping coefficient varying characteristic in accordance with a value of the input signal of the input signal generating means.

2. An apparatus for controlling a damping coefficient for a vehicular shock absorber as set forth in claim 1, wherein said input signal generating means comprises a sprung mass vertical G sensor installed on the vehicle body adjacent to the shock absorber.

3. An apparatus for controlling a damping coefficient for a vehicular shock absorber as set forth in claim 2, wherein said change rate of said damping coefficient changing means is larger when a sprung mass vertical speed derived on the basis of the input signal derived from said sprung mass vertical G sensor falls in predetermined high and low speed ranges than when the sprung mass vertical speed falls in a predetermined intermediate speed range.

4. An apparatus for controlling a damping coefficient for a vehicular shock absorber as set forth in claim 3, wherein said actuator comprises a pulse motor connected to said damping coefficient changing means.

5. An apparatus for controlling a damping coefficient for a vehicular shock absorber as set forth in claim 4, wherein said damping coefficient changing means comprises an adjuster installed in said shock absorber and the position of said adjuster is changed between three positions based on the movement of said pulse motor.

6. An apparatus for controlling a damping coefficient for a vehicular shock absorber as set forth in claim 5, wherein when said adjuster is placed at a second position, said shock absorber provides a first variable high damping coefficient ($+X_{max}$ position) at its expansion stroke side defined by its piston and a first predetermined low damping coefficient ($-X_{soft}$ position) at a compression stroke side, when said adjuster is placed at a first position, said shock absorber provides first and second predetermined low damping coefficients ($\pm X_{soft}$ position) at both expansion and compression stroke sides, and when said adjuster is placed at a third position, said shock absorber provides the predetermined low damping coefficient ($+X_{soft}$ position) at the expansion stroke side and provides a second variable high damping coefficient ($-X_{max}$ position) at the compression stroke side.

7. An apparatus for controlling a damping coefficient for a vehicular shock absorber as set forth in claim 6, wherein when said adjuster is placed at either the first or third position, the corresponding first or second variable high damping coefficient is changed at multiple stages in accordance with the stepping rotation angle of said adjuster.

8. An apparatus for controlling a damping coefficient for a vehicular shock absorber as set forth in claim 6, wherein said first and second variable high damping coefficients are changed between the multiple stages in proportion to the stepping rotation angle of said adjuster.

9. An apparatus for controlling a damping coefficient for a vehicular shock absorber as set forth in claim 6, wherein said change rate of the position of said adjuster is varied in accordance with a change in the value of the sprung mass vertical speed so as to cancel a non-linear characteristic of a damping coefficient varying characteristic with respect to the stepping rotation angle of said adjuster and so that the damping coefficient varying characteristic provides a linear characteristic.

10. An apparatus for controlling a damping coefficient for a vehicular shock absorber as set forth in claim 2, wherein said change rate of said damping coefficient changing means is larger when a sprung mass vertical speed derived on the basis of the input signal derived from said sprung mass vertical G sensor falls in a predetermined low speed range than when the sprung mass vertical speed falls in either a predetermined intermediate speed range or predetermined high speed range.

11. An apparatus for controlling damping coefficients for vehicular shock absorbers, the shock absorbers being interposed between predetermined parts of a vehicle body and corresponding tire wheels, respectively, said apparatus comprising:
a) actuators;
b) damping coefficient changing means for operatively changing the damping coefficient for each shock absorber in response to movement of said actuators, said damping coefficient changing means having a variable rate of change;
c) input signal generating means for generating input signals related to a vehicular behavior;
d) damping coefficient controlling means for generating and outputting control signals to said actuators so as to provide optimum damping coefficients for the respective shock absorbers via said damping coefficient changing means on the basis of the input signals from the input signal generating means; and
e) correction means for operatively correcting the rate of change of said damping coefficient changing means of each shock absorber corresponding to the variation in the rotated position of said damping coefficient changing means so as to correct a deviation between a target damping coefficient varying characteristic of the shock absorber and an actual damping coefficient varying characteristic in accordance with values of the input signals of the input signal generating means.

12. A method of controlling a damping force characteristic of a vehicular shock absorber, comprising the steps of:
a) detecting and inputting an input signal related to a vehicular body behavior;
b) generating and outputting a control signal to a pulse motor according to a value of the input signal, said pulse motor rotating an adjuster associated with a piston of the shock absorber so as to provide a target damping force coefficient for the shock absorber; and c) varying a change rate of a rotated position of said adjuster of the shock absorber so that a correction of a deviation between a target damping force varying characteristic and an actual damping force varying characteristic is carried out in accordance with a value of said input signal.

13. The method of claim 12, wherein said vehicular body behavior is a vertical speed of a sprung mass of the vehicular body.

* * * * *